US012775338B2

(12) United States Patent
Cheng

(10) Patent No.: US 12,775,338 B2
(45) Date of Patent: Oct. 27, 2026

(54) ERGONOMIC THUMB-ACTUABLE KEYBOARD

(71) Applicant: Innaworks Development Limited, Lower Hutt (NZ)

(72) Inventor: Stephen Cheng, Lower Hutt (NZ)

(73) Assignee: Innaworks Development Limited, Lower Hutt (NZ)

( * ) Notice: Subject to any disclaimer, the term of this patent is extended or adjusted under 35 U.S.C. 154(b) by 0 days.

(21) Appl. No.: 18/690,013

(22) PCT Filed: Oct. 3, 2022

(86) PCT No.: PCT/IB2022/059392

§ 371 (c)(1),
(2) Date: Mar. 7, 2024

(87) PCT Pub. No.: WO2023/057869

PCT Pub. Date: Apr. 13, 2023

(65) Prior Publication Data

US 2025/0130650 A1 Apr. 24, 2025

(30) Foreign Application Priority Data

Oct. 5, 2021 (NZ) ........................................ 780996

(51) Int. Cl.
*G06F 3/02* (2006.01)
*H01H 13/84* (2006.01)

(52) U.S. Cl.
CPC .......... *G06F 3/0216* (2013.01); *G06F 3/0219* (2013.01); *H01H 13/84* (2013.01); *H01H 2217/03* (2013.01)

(58) Field of Classification Search
CPC ..... G06F 3/0216; G06F 3/0219; H01H 13/84; H01H 2217/03
See application file for complete search history.

(56) References Cited

U.S. PATENT DOCUMENTS 4,244,659 A * 1/1981 Malt .......................... B41J 5/10
400/489
4,824,268 A * 4/1989 Diernisse H. V. .... G06F 3/0219
708/142

(Continued)

OTHER PUBLICATIONS

Australian Patent Office, International Search Report & Written Opinion for PCT/IB2022/059392 dated Nov. 30, 2022, 9 pp.

*Primary Examiner* — Sarvesh J Nadkarni
(74) *Attorney, Agent, or Firm* — Edwin S. Flores; Daniel J. Chalker; Chalker Flores, LLP

(57) ABSTRACT

A keyboard including: an inner thumb row including a plurality of inner thumb keys configured to be actuated by a thumb, such that a critical contact point of each of the plurality of keys is arranged along an inner thumb arc on an inner thumb key plane; and an outer thumb row including a plurality of outer thumb keys configured to be actuated by the thumb, a critical contact point of each of the plurality of thumb keys is arranged along an outer thumb arc on a outer thumb key plane, wherein the first and the second thumb key planes are non-coplanar, such that, when the keyboard is in use, said thumb key planes intersect with each other and a palm plane, where the palm plane is the plane upon which a user's palm lies when the keyboard is in use.

23 Claims, 7 Drawing Sheets

(56) References Cited

U.S. PATENT DOCUMENTS

| | | | | | |
|---|---|---|---|---|---|
| 5,017,030 | A | * | 5/1991 | Crews | H01H 13/807 400/489 |
| 5,122,786 | A | * | 6/1992 | Rader | G06F 3/0219 400/489 |
| 5,178,477 | A | * | 1/1993 | Gambaro | G06F 3/0219 400/489 |
| 5,367,298 | A | * | 11/1994 | Axthelm | H01H 13/84 D14/391 |
| 5,426,449 | A | | 6/1995 | Danziger | |
| 5,689,253 | A | * | 11/1997 | Hargreaves | B41J 5/10 400/489 |
| 6,005,496 | A | * | 12/1999 | Hargreaves | G06F 3/0202 400/475 |
| 6,031,469 | A | * | 2/2000 | Dodd | G06F 3/0234 400/489 |
| 6,084,576 | A | * | 7/2000 | Leu | G06F 3/0213 345/168 |
| 6,698,952 | B1 | * | 3/2004 | Goddard | G06F 3/0216 400/489 |
| 6,802,662 | B1 | * | 10/2004 | Cheng | G06F 3/03543 400/489 |
| 7,825,833 | B2 | * | 11/2010 | Manthe, III | G06F 3/0238 345/169 |
| 8,766,823 | B2 | * | 7/2014 | Zilberman | G06F 21/316 341/23 |
| 2001/0021332 | A1 | | 9/2001 | Boldy et al. | |
| 2004/0037604 | A1 | * | 2/2004 | McNamara | G06F 15/0225 400/88 |
| 2005/0052419 | A1 | * | 3/2005 | Burroughs | G06F 3/0219 345/168 |
| 2012/0162078 | A1 | | 6/2012 | Ferren et al. | |

* cited by examiner

ERGONOMIC THUMB-ACTUABLE KEYBOARD

CROSS-REFERENCE TO RELATED APPLICATIONS

This application is a National Stage of International Application No. PCT/IB2022/059392, filed Oct. 3, 2022, claiming the priority of New Zealand Application No. 780996, filed Oct. 5, 2021. The contents of each of which are incorporated by reference in their entirety.

FIELD OF THE INVENTION

The present invention relates to keyboards, and, more particularly, to a keyboard with a proportion of the keys actuated by the thumbs of a user.

BACKGROUND OF THE INVENTION

The widespread use of electronic devices such as electronic typewriters, computer keyboards, and other data input electronic devices has resulted in health issues due to repeated wrist, palm and finger motions. Computer keyboards are traditionally a plurality of parallel rows of keys. Often these parallel rows of keys are staggered so as to avoid parallel columns. This staggered row configuration was used as most common keyboards were simply a direct copy of typewriter keyboards and the staggered layout prevented keys jamming. This keyboard layout, for want of a better term, will be referred to as a 'Common Keyboard'.

Some keyboards seek to arrange the keys such that they generally align with the natural motions of our fingers. In particular it may be observed that each finger draws a line when it curls and uncurls in its natural movement, which is primarily due to the flexion-extension motions of the finger joints. In such a layout, keys are generally arranged in an ortholinear manner, i.e., in a series of roughly parallel columns with each key in a column actuated by a specific finger. With this essentially parallel column layout, ortholinear keyboards have been found to minimize the movement of the wrists, forearms and elbows during when compared to when operating a Common Keyboard. The motions of the fingers when typing on an ortholinear keyboard are primarily flexion and extension, with much reduced adduction and abduction when compared to a Common Keyboard. Such ortholinear keyboards are typically considered to be more ergonomic than the Common Keyboards.

Ortholinear keyboards are further divided into two subcategories. Flat ortholinear keyboards are those in which the keys lie on one or more planes; one such example is Ergodox (Ergodox is a registered trade mark of OXIS Isle of Man Limited). Contoured ortholinear keyboards are those in which the keys are laid out in columns but the columns lie on one or more curved surfaces. For example the Kinesis Advantage 2 (KINESIS is a registered trade mark of Kinesis Corporation) has two concave portions each containing an ortholinear arrangement of keys.

It's also worth noting that in a Common Keyboard, the thumb is generally underutilized. Typically, only the spacebar key and no other keys are actuated with the thumbs. Thumbs are powerful digits that may be exercised with fewer risks of injury than some of the weaker fingers. As such it would make sense for a keyboard design to make better use of the thumbs, by assigning more keys to be actuated by the thumbs. For convenience, a key intended to be actuated by a thumb will be referred to as a 'Thumb Key', and a group of Thumbs Keys intended to be actuated by a single thumb will be referred to as a Thumb Cluster.

There had been many different arrangements of Thumb Clusters as embodied in the keyboards in the prior art. However, in many of these Thumb Cluster designs, the thumb actuated keys require moving the wrist/forearm/elbow or stretching of the thumb. Such movements reduce the benefit of an ortholinear keyboard as they require additional movement. In some Thumb Cluster designs, the actuation of a Thumb Key causes the thumb to touch and interfere with another key.

Overuse and inappropriate use of Common Keyboards frequently result in injuries. Users of the Common Keyboard must typically move their wrists, forearms, or elbows, as well as engage their fingers in flexion, extension, adduction, and abduction motions, in order to reach and actuate the keys.

It is an object of the present invention to provide a keyboard that overcomes one or more of the limitations discussed above, or provide a consumer with a useful choice.

SUMMARY OF THE INVENTION

The present invention provides a keyboard including:

an inner thumb row including a plurality of inner thumb keys configured to be actuated by a thumb, such that a critical contact point of each of the plurality of keys is arranged along an inner thumb arc on an inner thumb key plane; and an outer thumb row including a plurality of outer thumb keys configured to be actuated by the thumb, a critical contact point of each of the plurality of thumb keys is arranged along an outer thumb arc on a outer thumb key plane, wherein the first and the second thumb key planes are non-coplanar, such that, when the keyboard is in use, said thumb key planes intersect with each other and a palm plane, where the palm plane is the plane upon which a user's palm lies when the keyboard is in use Preferably the thumb key planes and palm plane, when the keyboard is in use, are configured to intersect at a CMC plane passing through a user's carpometacarpal (CMC) joint, such that said CMC plane is perpendicular to a line parallel a user's forearm.

Preferably, where the inner thumb arc lies on the inner thumb key plane, said inner thumb arc follows a circular path from an inner thumb arc center at an inner arc radius, where the inner thumb arc center also lies on the inner thumb key plane. In a more preferred form, where the outer thumb arc lies on the outer thumb key plane, said outer thumb arc follows a circular path from an outer thumb arc center at an outer arc radius, where the outer thumb arc center also lies on the outer thumb key plane.

In a highly preferred form, the inner arc center and outer arc center have an arc center spacing of up to 15 mm, where the arc center spacing is the distance between the arc centers.

Preferably, when the keyboard is in use, at least one arc center is coincident with the user's CMC joint. In a highly preferred form both arc centers are coincident with the user's CMC joint.

Preferably the keyboard further includes a plurality of keys, finger keys, configured to be actuated by a user's fingers, said finger keys are arranged such that when the keyboard is in use the user's palm does not require substantial movement to actuate them. In a further preferred form the finger keys have a layout selected from a group consisting of, an ortho-linear layout, a columnar stagger layout, a uniform stagger layout, a symmetric stagger layout and any combination thereof.

Preferably the keyboard includes two portions, a first portion and a second portion, such that each portion includes a plurality of finger keys and a thumb cluster, where the thumb cluster is the combination of the inner thumb keys and outer thumb keys of that portion. Preferably the first portion and second portion are separate parts of the keyboard. In a more preferred form the first portion and second portion are releasably joined.

Preferably, when the keyboard is in use the movement of the thumb from any one of the thumb keys to any other thumb key is substantially and primarily through flexion or extension.

Preferably, when the keyboard is in use, the angle between the palm plane and at least one of the thumb key planes, as those planes intersect the CMC plane, is a primary palm thumb key plane angle θ, said primary palm thumb key plane angle θ is from 160 to 180 degrees. Preferably, the primary palm thumb key plane angle θ for each of the thumb key planes is independently selected from the range of 160 to 180 degrees. In a highly preferred form, the thumb key planes are coincident.

Preferably each thumb key has a key cap with a cylindrical profile, with the axis of each key cap substantially aligned with the radius of the respective thumb arc.

Preferably there are at least three thumb keys in each thumb row.

In one preferred form the number of thumb keys in the inner thumb row is greater than the number of thumb keys in the outer thumb row.

In an alternative preferred form the number of thumb keys in the outer thumb row is greater than the number of thumb keys in the inner thumb row.

In an alternative form of the present invention, a keyboard is provided. The keyboard includes an inner thumb row including a plurality of keys with their critical contact points arranged along an inner arc on a first plane. The keyboard further includes an outer thumb row including a plurality of keys with their critical contact points arranged along an outer arc intended to be actuated by the same thumb on a second plane.

Preferably, the keyboard includes a plurality of keys intended to be actuated by fingers, arranged in a manner of not requiring substantial movement of palm or hand to actuate during a typical typing session.

Preferably, the critical contact points of the keys in inner thumb row are arranged along an inner arc on a first plane, and the critical contact points of the keys in outer thumb row are arranged along an outer arc on a second plane, and the first and second planes being non-coplanar.

Preferably, the inner arc and the outer arc are substantially circular shaped arcs.

Preferably, a center of the substantially circular inner arc formed by the critical contact points present on each of the plurality of keys of the inner thumb row and a center of the substantially circular shaped outer arc formed by the critical contact points present on each of the plurality of keys of the outer thumb row are substantially at the same predetermined location. In one of the variants, the distance between the center of the two arcs is less than 15 mm.

Preferably, a thumb carpometacarpal joint is in a natural typing position when positioned within 15 mm of the center of the inner arc and the center of the outer arc.

Preferably, each of the plurality of keys comprises a key cap mounted on a key switch and each of the key cap associated with the plurality of keys of the inner thumb row are identical to each of the key cap associated with the plurality of keys of the outer thumb row.

Preferably, each key cap associated with the plurality of keys of the inner thumb row are non-identical to each key cap associated with the plurality of keys of the outer thumb row, and that the key switches of the keys in the inner thumb row and outer thumb row are all mounted on the same plane.

Preferably, the plurality of keys positioned along each of the thumb row i.e. the inner thumb row and the outer thumb row, are at least two in number, and the number may be increased to utilize the maximum thumb tip travel distance along the arc with thumb carpometacarpal joint as center.

Preferably, a key cap associated with one of the plurality of keys of inner thumb row and outer thumb row is of a cylindrical profile, and the fingers position just prior to touching the key cap is substantially parallel to the key cap surface along the axis of the key cap symmetry and the critical contact point of the key would be on the symmetry line along the middle of the cylindrical profile key cap surface.

Preferably, movement of the thumb from one key in the inner thumb row to another key in the inner thumb row is substantially and primarily through a flexion or extension motion of the thumb carpometacarpal joint.

Preferably, movement of the thumb from one key in the outer thumb row to another key in the outer thumb row is substantially and primarily through a flexion or extension motion of the thumb carpometacarpal joint.

Preferably, when the hand is at a natural typing position, the angle between plane B on which critical contact points of the inner thumb row keys are arranged and the palm plane is between 160 to 180 degrees, and/or the angle between plane A on which critical contact points of the outer thumb row keys are arranged and the palm plane is between 160 to 180 degrees.

Preferably, the computer keyboard additionally comprises a palm rest.

Variants in accordance with the present invention aim to reduce finger travel and fatigue while typing.

This together with the other aspects of the present invention, along with the various features of novelty that characterize the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary variants of the present invention.

BRIEF DESCRIPTION OF THE DRAWINGS

The advantages and features of the present invention will become better understood with reference to the following detailed description taken in conjunction with the accompanying drawing, in which.

DEFINITIONS

APPROXIMATELY: when used this term is used to indicate that the parameter specified may vary by up to 10% or up to 10°.

COMMON KEYBOARD: a keyboard with the keys laid out in a plurality of parallel rows, with the keys in each row staggered in relation to the keys in the immediately adjacent row or rows. Similar to that of a standard typewriter keyboard.

CRITICAL CONTACT POINT: The area where a digit initially contacts a key during a key press motion under natural typing conditions. This contact point is typically the same point on the contact surface of the key through which the majority of the actuation force is exerted onto the key.

PLURALITY: Two or more.

THUMB KEY: a key that is actuated by a thumb.

THUMB CLUSTER: A group of keys intended to be actuated by one thumb.

DETAILED DESCRIPTION OF THE DISCLOSURE

The following description includes the preferred best mode of the first variant of the present invention. It will be clear from this description of the invention that the invention is not limited to these illustrated variants, but the invention also includes a variety of modifications and variants thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The terms "a" and "an" herein do not denote a limitation of quantity, but rather denote the presence of at least one of the referenced items.

The terms "having", "comprising", "including", and variations thereof signify the presence of a component. That is, the terms 'comprise', 'comprises' and 'comprising' are inclusive rather than exclusive unless the context requires it.

Figure 1:
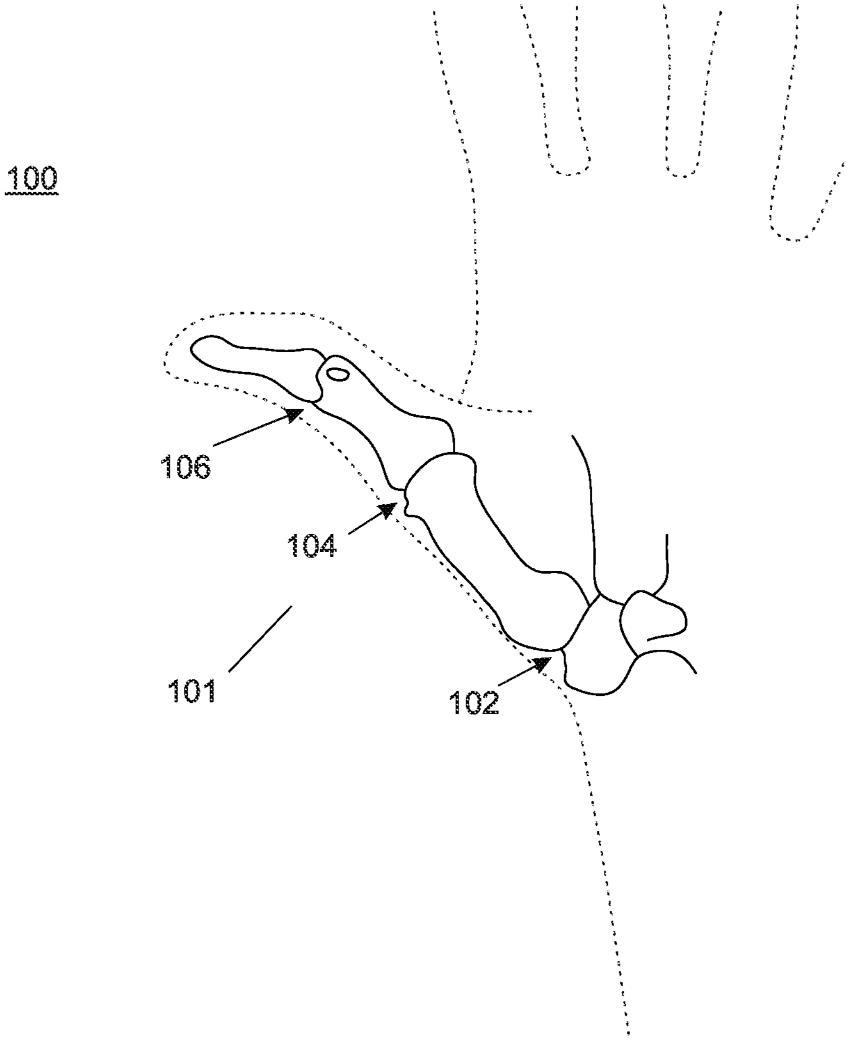
FIG. 1: is a plan view, palm uppermost, of a user's left hand thumb joints, with the hand as a dashed outline.
Figure 2:
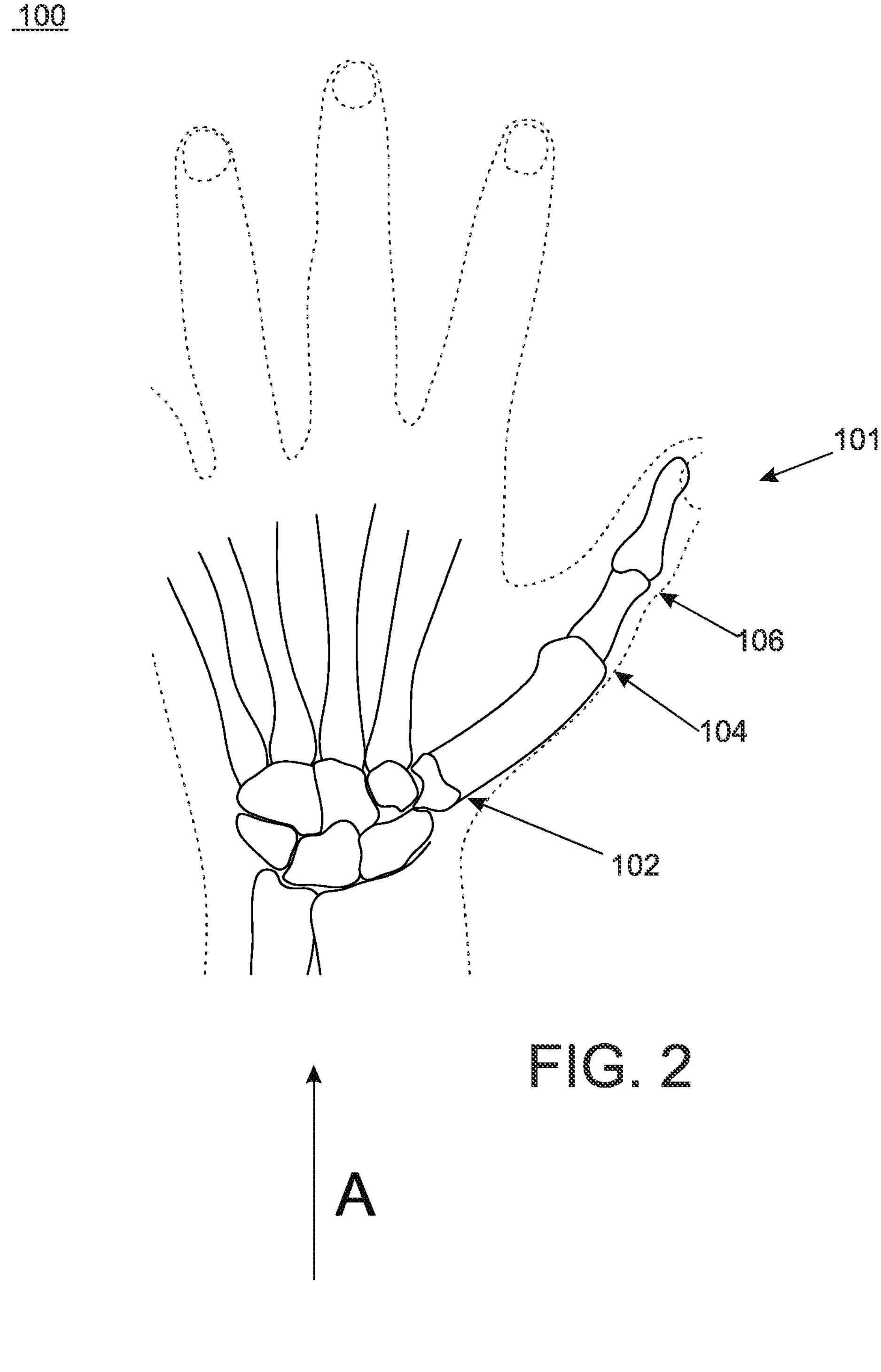
FIG. 2: is a palm down view of a user's left hand thumb joints with the hand shown as a dashed outline.

Referring to Figure land FIG. 2*a* user's left hand 100 with the thumb 101 and three thumb joints 102,104,106 is shown. The three thumb joints 102,104,106 of the user are the carpometacarpal (CMC) joint 102, the metacarpophalangeal (MCP) joint 104, and the interphalangeal (IP) joint 106 (closest to the tip of the thumb). Thumbs are strong digits, and they may be exercised with less injury risks compared to some of the weaker fingers there are benefits in using these more when using a keyboard 200 (see FIG. 3). The arrow A is in line with the wrist and it points to the fingertips.

Figure 3:
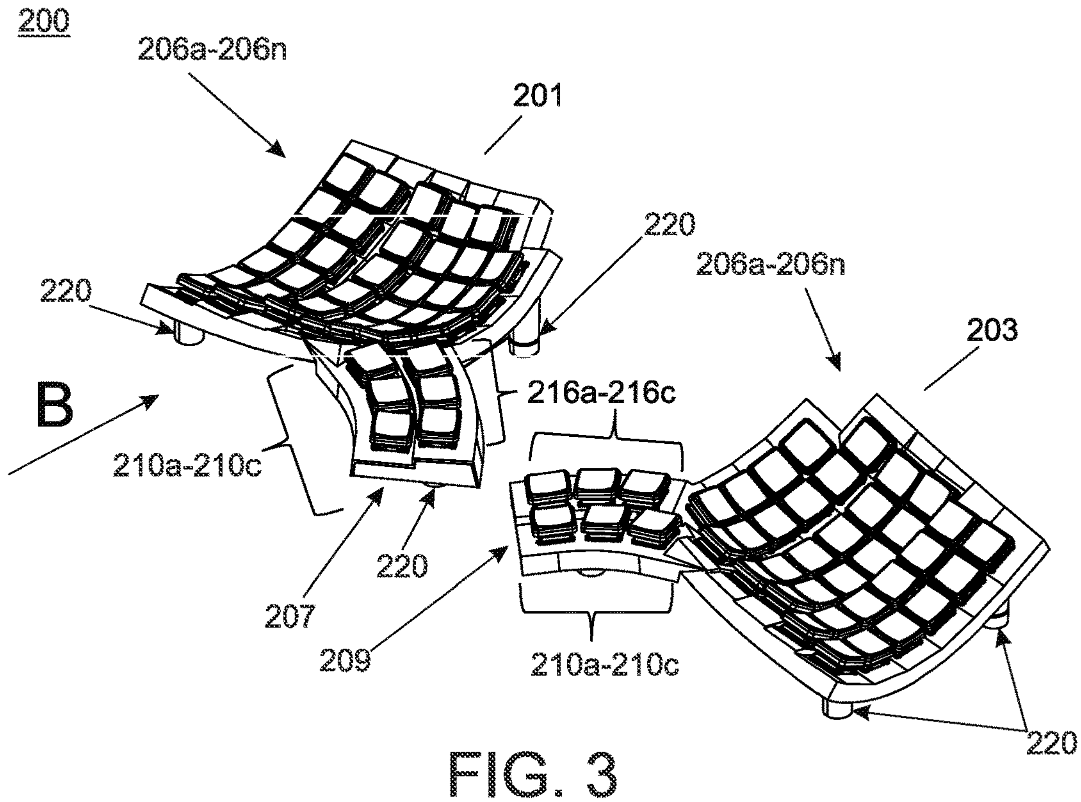
FIG. 3: is a pictorial view of a first variant keyboard consisting of a first portion and a second portion, each portion including a thumb cluster consisting of two rows of thumb keys.
Figure 4:
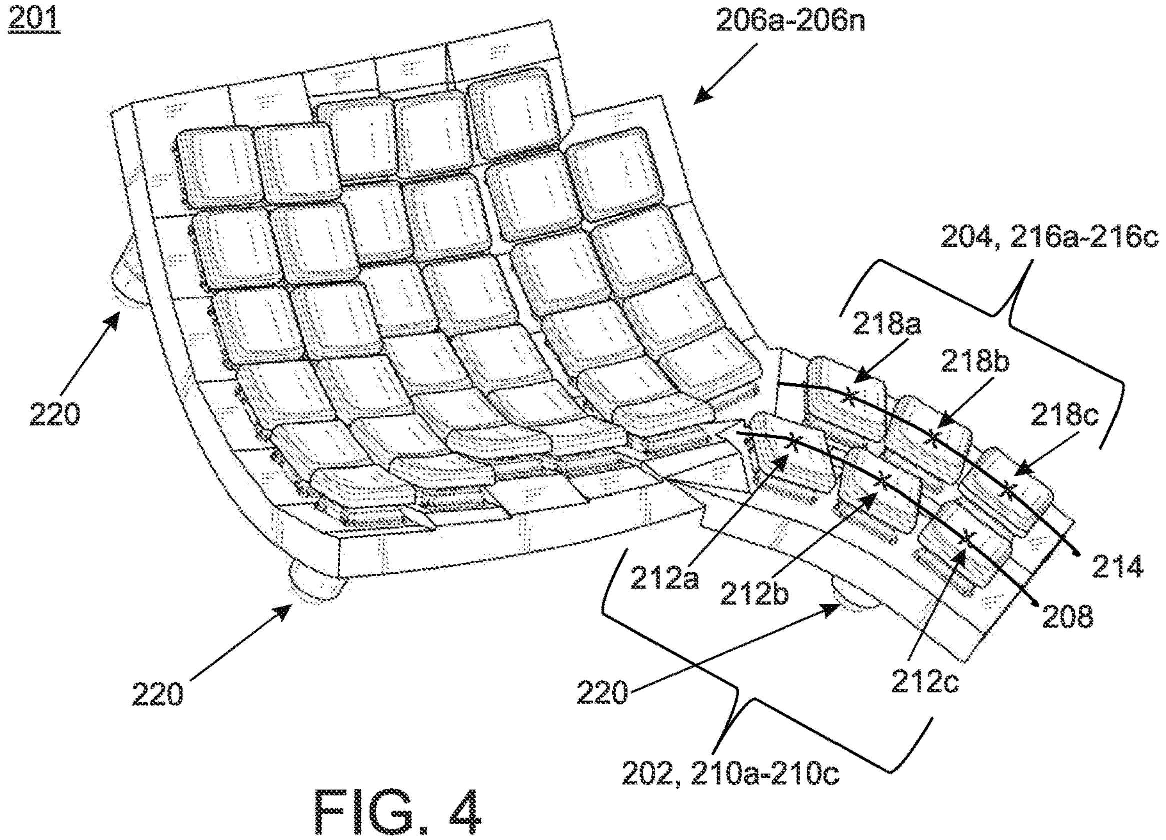
FIG. 4: is a pictorial view of the first portion of the first variant of the keyboard.
Figure 5:
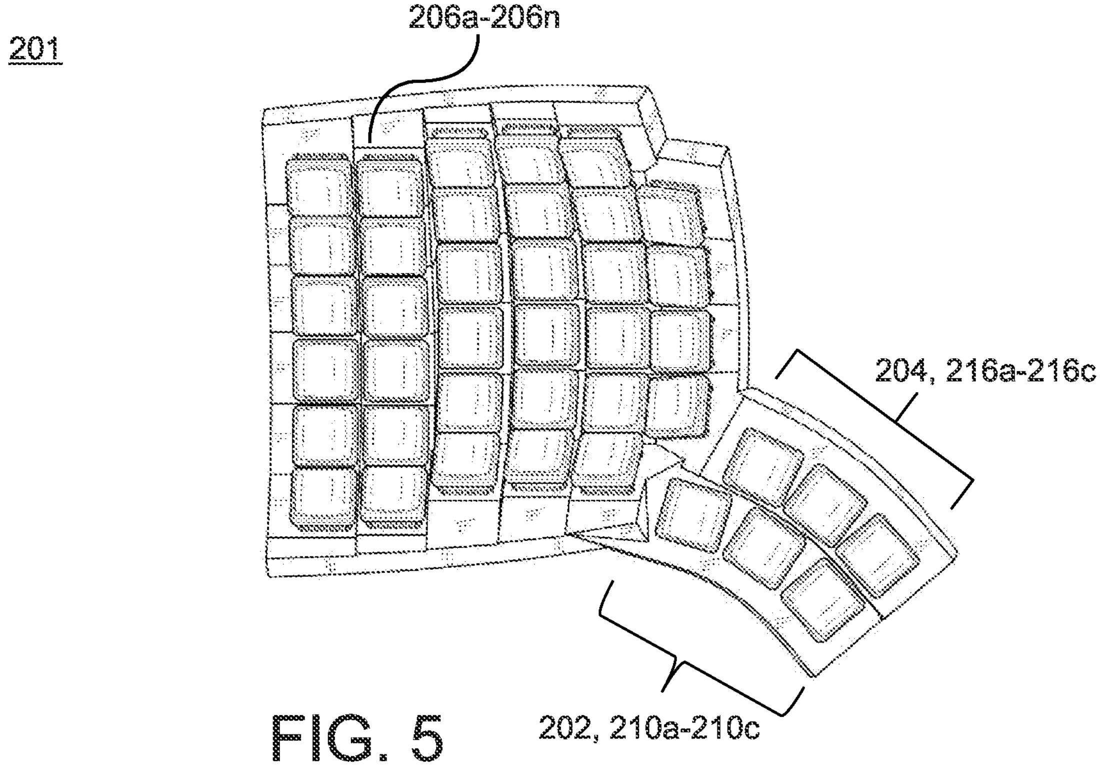
FIG. 5: is a plan view of the first portion of the first variant of the keyboard.

Referring to FIG. 3, and FIG. 4 where required, a first variant, the preferred variant, of a computer keyboard 200 is shown. The computer keyboard 200 includes a first portion 201 and a second portion 203 which are essentially mirror images of each other, the first portion 201 is configured for use with one hand of a user (not shown) and the second portion 203 is configured for use with the other hand of the user (not shown).

Each portion 201,203 includes finger keys (206*a*-206*n*) and two rows of thumb keys 210*a*-210*c*, 216*a*-216*c*, an inner thumb row 202 (inner thumb keys 210*a*-210*c*) and an outer thumb row 204 (outer thumb keys 216*a*-216*c*). The inner thumb row 202 is closer to the user during use than the outer thumb row 204. In use the finger keys 206*a*-206*n* are intended to be actuated by the fingers of a user (see FIG. 7) and the thumb keys 210*a*-210*c*,216*a*-216*c* are intended to be actuated by the thumbs of the user (see FIG. 7). The keyboard 200 further includes a first thumb cluster 207 and a second thumb cluster 209, where the first thumb cluster 207 is the combination of the thumb keys 210*a*-210*c*, 216*a*-216*c* of the first portion 201 and the second thumb cluster 207 is the combination of the thumb keys 210*a*-210*c*, 216*a*-216*c* of the second portion 203.

Referring to FIG. 4 the critical contact point 212, 218, where the digit makes initial contact with the key 206*a*-206*n*, 210*a*-210*c*, 216*a*-216*c* during a key press motion under natural typing conditions, for each thumb key 210*a*-210*c*, 216*a*-216*c*, is shown. The critical contact point 212, 218 is typically the same point on the contact surface of the key 206*a*-206*n*, 210*a*-210*c*, 216*a*-216*c* through which the majority of the actuation force are exerted onto the key 206*a*-206*n*, 210*a*-210*c*, 216*a*-216*c*. The critical contact point 212 for each of the plurality of inner thumb keys 210*a*-210*c* in the inner thumb row 202 are arranged to form an inner thumb arc 208 and the critical contact point 218 for each of the plurality of outer thumb keys 216*a*-216*c* in the outer thumb row 204 are arranged along an outer thumb arc 214.

Figure 6:
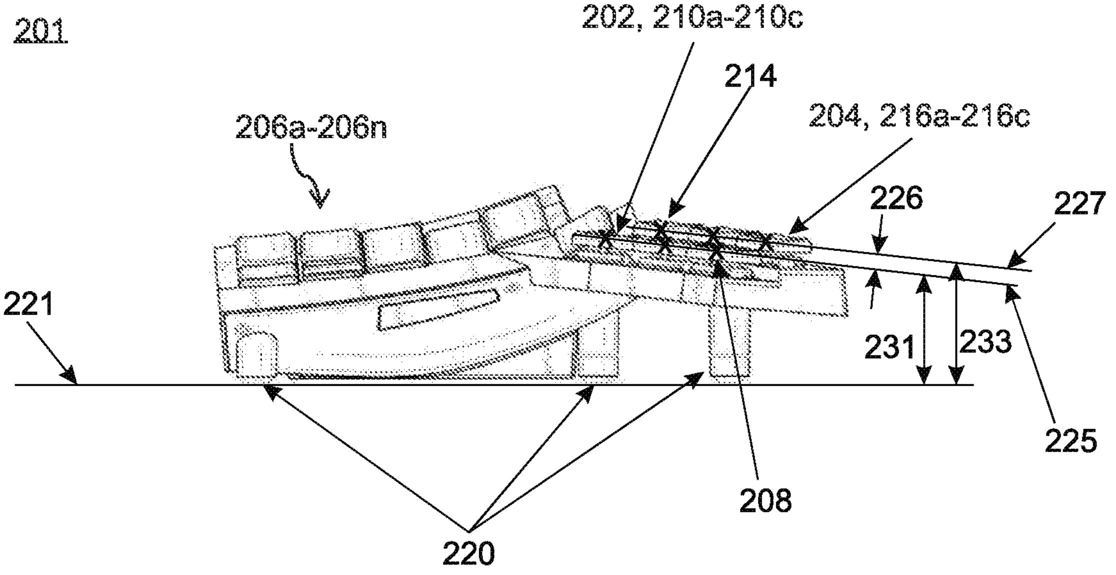
FIG. 6: is an end view of the first portion of the first variant of the keyboard.

Referring to FIG. 3, FIG. 4 or FIG. 6 the keyboard 200, or first portion 201, is shown including a plurality of legs 220 to support the keyboard 200, or portion 201,203, on a support surface 221 (see FIG. 6) during usage and minimizes displacement during a typing session.

Referring to FIG. 6 an end view of the first portion 201 on a support surface 221 is shown with the outer thumb arc 214 and the inner thumb arc 208 shown lying on an inner thumb key plane 225 and an outer thumb key plane 227 respectively. The first portion 201 is shown with the supports 220 engaged with a horizontal support surface 221.

The first thumb key plane 225 and the second thumb key plane 227 are spaced apart by a thumb key plane separation distance 226. The inner thumb key plane 225 and the outer thumb key plane 227 are shown as essentially parallel, however for certain configurations they may be non-parallel. Where the thumb key planes 225, 227 are not parallel the minimum separation between the thumb key planes 225, 227, where the thumb key plane 225,227 passes through the thumb keys 210*a*-210*c*, 216*a*-216*c*. is the thumb key plane separation distance 226. As the thumb rows 202,204 lie on separate thumb key planes 225,227 a user may freely actuate the outer thumb keys 216*a*-216*c* lying on the outer thumb key plane 227 without interference of the inner thumb keys 210*a*-210*c* lying on the inner thumb key plane 225.

In use the inner thumb key plane 225 is separated from the support surface 221 by an inner support-plane distance 231 and the outer thumb key plane 227 is separated from the support surface 221 by an outer support-plane distance 233. The inner support plane distance 231 is less than the outer support plane distance 233. Due to the configuration of the thumb rows 202,204 the actuation of any of the thumb keys 210*a*-210*c*, 216*a*-216*c* selected from either the inner thumb row 202 or the outer thumb row 204 through a natural thumb motion, do not normally result in the thumb interfering or touching any of the remaining plurality of thumb keys 210*a*-210*c*, 216*a*-216*c*.

It is preferred that each thumb arc 208,214, see FIG. 4, is an essentially circular arc with the same center, but a different radius. In use the thumb CMC joint 102, of the hand used for that portion 201,203 of the keyboard 200, is located close to, or at, the center of the circle scribing the two thumb arcs 208,214 when the hand is placed in a natural typing position. The two thumb rows 202,204 are arranged and dimensioned such that when actuating an outer thumb key in the outer thumb row 204 the thumb (not shown) has a reduced chance of touching or interfering with a thumb key in the inner thumb row 202. It should be noted, see FIG. 4, that one or both of the thumb arcs 208,214 can be a section of an ellipse or an oval rather than a section of a circle.

Figure 7:
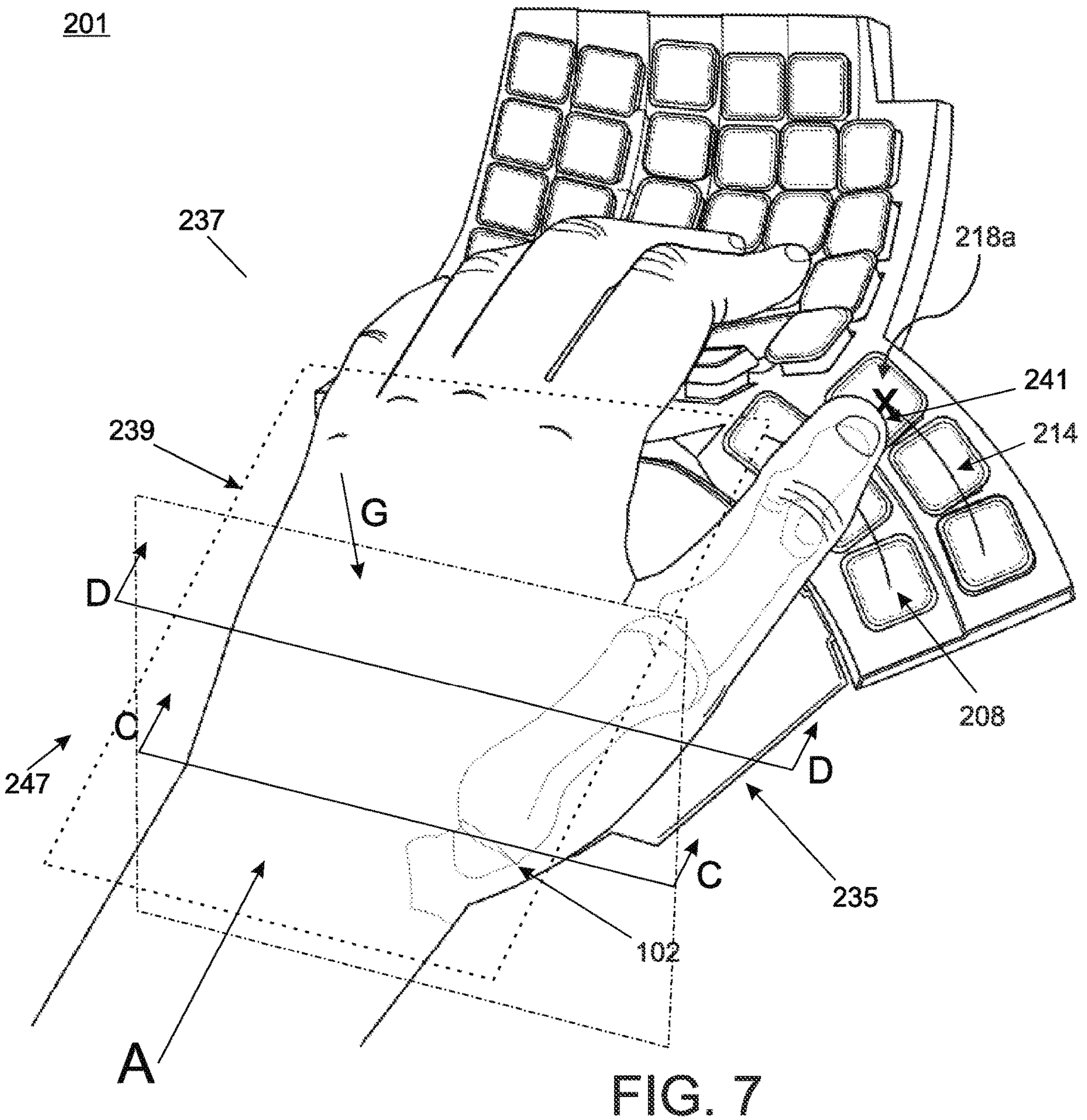
FIG. 7: is a pictorial view of the first portion of the first variant of the keyboard with a user's hand and wrist rest shown.

Referring to FIG. 7, the first portion 201 is shown, with an optional palm rest 235, in use with a hand 237 at a natural typing position with the palm of the user (not shown) lying on a palm plane 239 (shown with a dashed outline). The thumb key plane 239 will normally pass through the users CMC joint 102, though due to injury or natural defects/variations in some users it may pass close to, but not through, the CMC joint 102.

As shown in FIG. 7 when the first portion 201 is in use it is preferable to have a thumb joint motion that is primarily a flexion-extension motion at the thumb carpometacarpal (CMC) joint 102 as this is the most comfortable compared to other thumb joint motions for a normal user. This flexion-extension motion at the thumb CMC joint 102 allows a large movement at the thumb tip 241 due to the thumb CMC joint's 102 position at the base of the thumb, and the significant movement range of the flexion-extension motion at the thumb CMC joint 102. Normally the thumb CMC joint 102 allows 40° to 50° of thumb flexion-extension parallel to the palm plane 239. Assuming a movement of 40 degrees, and using 100 mm as the length between thumb CMC joint 102 and thumb tip 241, with the thumb CMC joint 102 located at the center of the thumb arc radius (where the thumb arc 208,214 is a portion of a circle), the thumb CMC joint 102 allows approximately 70 mm of thumb tip 241 travel along a thumb arc 208, 214. Accordingly, where three thumb keys 210*a*-210*c*, 216*a*-216*c* are present in a thumb row 202,204, a thumb key 210*a*-210*c*, 216*a*-216*c* spacing of 18 mm to 20 mm can be used. If the thumb keys 210*a*-210*c*, 216*a*-216*c* in a thumb row 202,204 are arranged in a single arc with the thumb CMC joint 102 at the center of the circle scribing that are, then three thumb keys 210*a*-210*c*, 216*a*-216*c* can be comfortably reached by the thumb purely by the flexion-extension motion at the thumb CMC joint 102 without movement of the palm. This said, some users, due to their thumb CMC joint 102 to thumb tip 241 length can comfortably reach four thumb keys 210*a*-210*c*, 216*a*-216*c* in a single thumb row 202,204 (not shown). If a wider range of flexion-extension movement and/or a narrower thumb key 210*a*-210*c*, 216*a*-216*c* spacing is used, then a user can comfortably reach four or more thumb keys 210*a*-210*c*, 216*a*-216*c* in a thumb arc 208,214 (not shown) purely by the thumb CMC joint 102 flexion-extension motion without movement of the palm. In certain configurations a user can comfortably reach up to seven thumb keys 210*a*-210*c*, 216*a*-216*c* in a thumb arc 208,214 (not shown) purely by the thumb CMC joint 102 flexion-extension motion without movement of the palm. It should be noted that there may be some movement of the palm when using the keyboard 200 (see FIG. 3) but this is minimal or essentially eliminated for most users.

Figure 8:
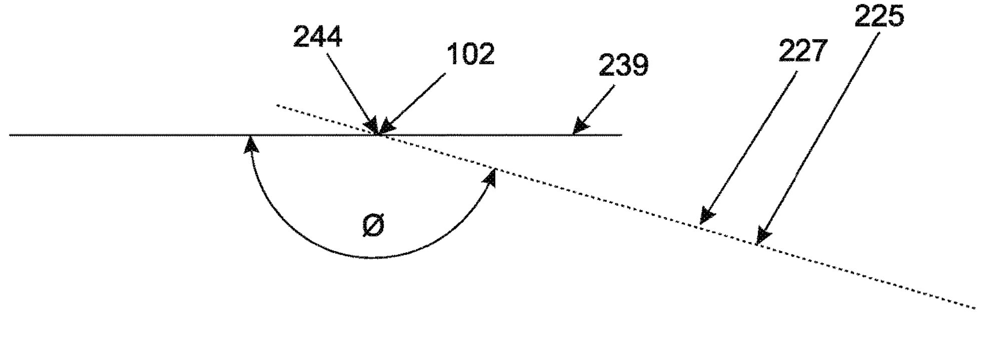
FIG. 8 is a cross-sectional view along line C-C in the direction of the arrows, with the cross section showing only the thumb key planes and the palm plane.

Referring to FIG. 8 a view of the palm plane 239 and the thumb key planes 225,227 along the line C-C (see FIG. 7) in the direction of the arrows is shown. The section line C-C is perpendicular to line A, where line A is parallel to the forearm. The cross-section line C-C lies on a CMC plane (shown as a dash-dot-dash line) 247 passes through the CMC joint 102. The thumb key planes 225,227 are, in an optimum configuration, co-incident and optimally the thumb CMC joint 102 lies on the palm plane 239 and is intersected by the thumb key planes 225,227. It has been found that the angle between the thumb key planes 225,227 and the palm plane 239, where the section passes through the CMC joint 102, the primary palm thumb key plane angle θ, is optimally from 160° to 180° (parallel). It should be noted that although the thumb plane 225,227 and the palm plane 239 will normally cross at the CMC joint 102, at times two or more of the planes 225,227,239 will cross at a combined plane intersection 244 which is offset from the CMC joint 102. It should also be noted that θ may be different for thumb key plane 225 and thumb key plane 227.

Figure 9:
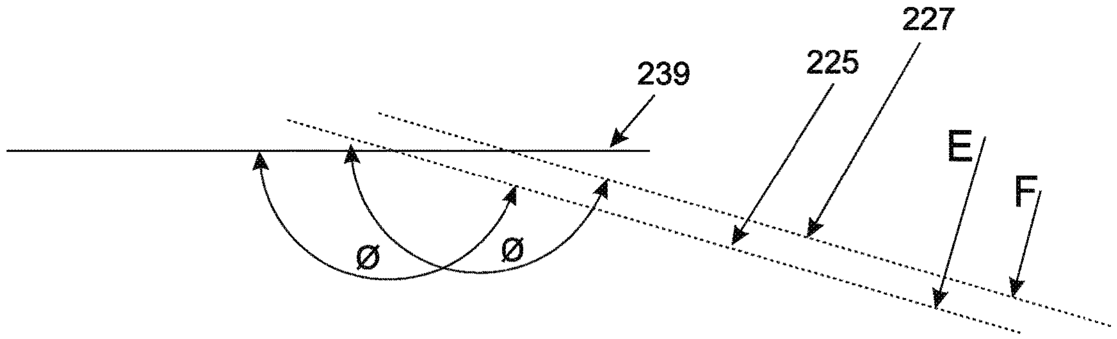
FIG. 9: is a cross-section along the line D-D viewed in the direction of the arrows, with the cross section showing only the thumb key planes and the palm plane.

Referring to FIG. 9 a cross sectional view showing only the palm plane 239 and the thumb key planes 225,227 along the line D-D (see FIG. 7) in the direction of the arrows is shown. The section line D-D is perpendicular to arrow A where arrow A is parallel to the forearm. The cross-section line D-D is located closer to the first portion 201 than line C-C (see FIG. 7). The thumb key planes 225,227 are parallel but spaced apart with the palm plane 239 intersected by the thumb key planes 225,227 at separated points. It has been found that the angle between the thumb key planes 225,227 and the palm plane 239, where the section is located between the CMC joint 102 and the first portion 201 is the same as the primary palm thumb key plane angle θ and optimally from. 160° to 180°. Noting that primary palm thumb key plane angle θ will be the same for both thumb key planes 225,227 if they are coincident in section C-C. If the thumb key planes 225,227 are not coincident then the primary palm thumb key plane angle θ will be independently chosen in the range of 160° to 180° for each of the thumb key planes 225,227.I.

In any of the variants the type of key/switch used for the various keys 206*a*-206*n*, 210*a*-210*c*, 216*a*-216*c*, independent of any other key 206*a*-206*n*, 210*a*-210*c*, 216*a*-216*c*, can be of any known type, for example: membrane, mechanical, electro-mechanical, magnetic, optical, integrated, replaceable key cap/switch combination, contact, non-contact and of any form tactile, clicky or linear. It should also be noted that even though the switch travel may be different for different keys 206*a*-206*n*, 210*a*-210*c*, 216*a*-216 at no time throughout the actuation of a specific thumb key 210*a*-210*c*, 216*a*-216*c* does it or the thumb normally interfere with any other thumb key 206*a*-206*n*, 210*a*-210*c*, 216*a*-216*c*.

Figure 10:
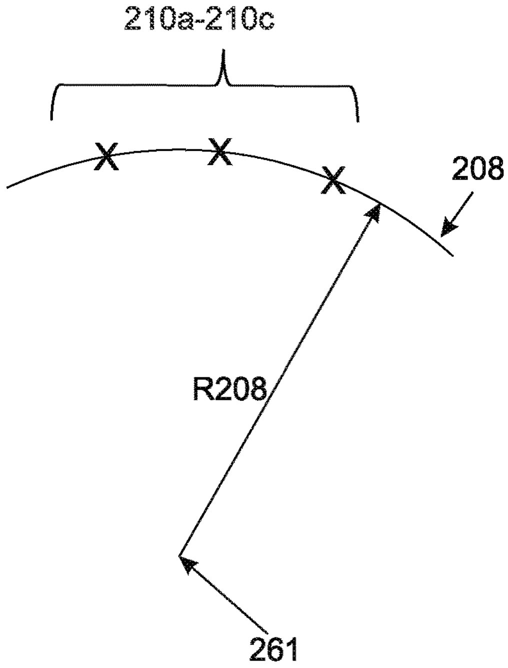
FIG. 10: is a diagrammatic view along line E in the direction of the arrow, where arrow E is perpendicular to the inner thumb key plane, showing the inner thumb arc.

Referring to FIG. 10 a diagrammatic view of the inner thumb arc 208 on the inner thumb key plane 225 (see FIG. 9) looking in the direction of arrow E which is perpendicular to the inner thumb key plane 225. In this view the inner thumb keys 210*a*-210*c* lie in an inner thumb arc 208 which is a circular arc drawn from an inner thumb arc center 261 with an inner arc radius R208. The inner arc center 261 lies on the inner thumb key plane 225.

Figure 11:
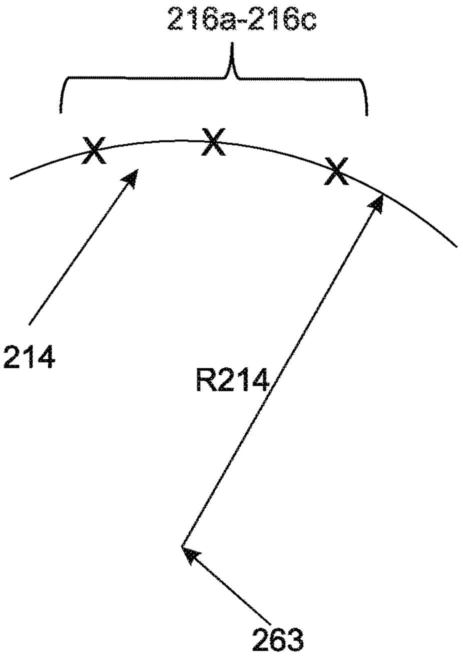
FIG. 11: a diagrammatic view along line F in the direction of the arrow, where arrow F is perpendicular to the outer thumb key plane, showing the outer thumb arc.

Referring to FIG. 11 a diagrammatic view of the outer thumb arc 214 on the outer thumb key plane 225 (see FIG. 9) looking in the direction of arrow F (see FIG. 9) which is perpendicular to the outer thumb key plane 225. In this view the inner thumb keys 216*a*-216*c* lie in an outer thumb arc 214 which is a circular arc drawn from an outer thumb arc center 263 with an outer arc radius R214. The outer arc center 263 lies on the outer thumb key plane 227.

Figure 12:
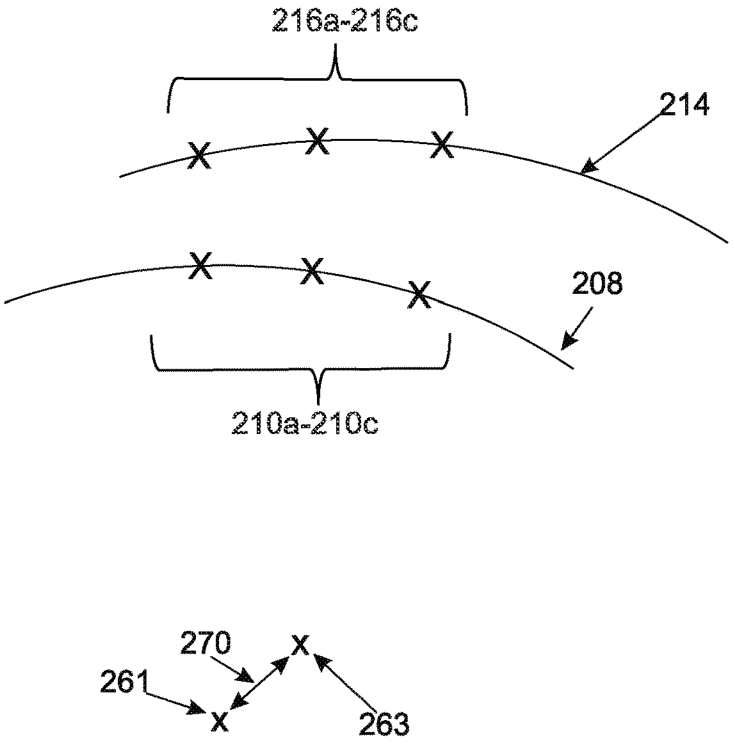
FIG. 12 is a diagrammatic view along line G in the direction of the arrow, where the line G is perpendicular to the palm plane, of the thumb arcs and thumb arc centers.

Referring to FIG. 12, which is a view along line G in the direction of the arrow, where G is perpendicular to the palm plane 239, the inner arc center 261 and the outer arc center 263 are shown separated by an arc center spacing 270 where the arc center spacing 270 is preferably less than 20 mm and optimally less than 15 mm, it can of course be any length from 0 mm to these maximum values. The thumb arcs 208, 214 projected onto the palm plane 239 match the thumb arcs 208, 214 on the physical keyboard 200 or portion 201,203 (see FIG. 4). It should be noted that the arc centers 261,263 are separated in three dimensions and as such the arc center spacing 270 can have a component that is off the palm plane 239, in this case the arc center spacing 270 still falls in the range 0 mm to 20 mm with an optimal range of 0 mm to 15 mm.

Figure 13:
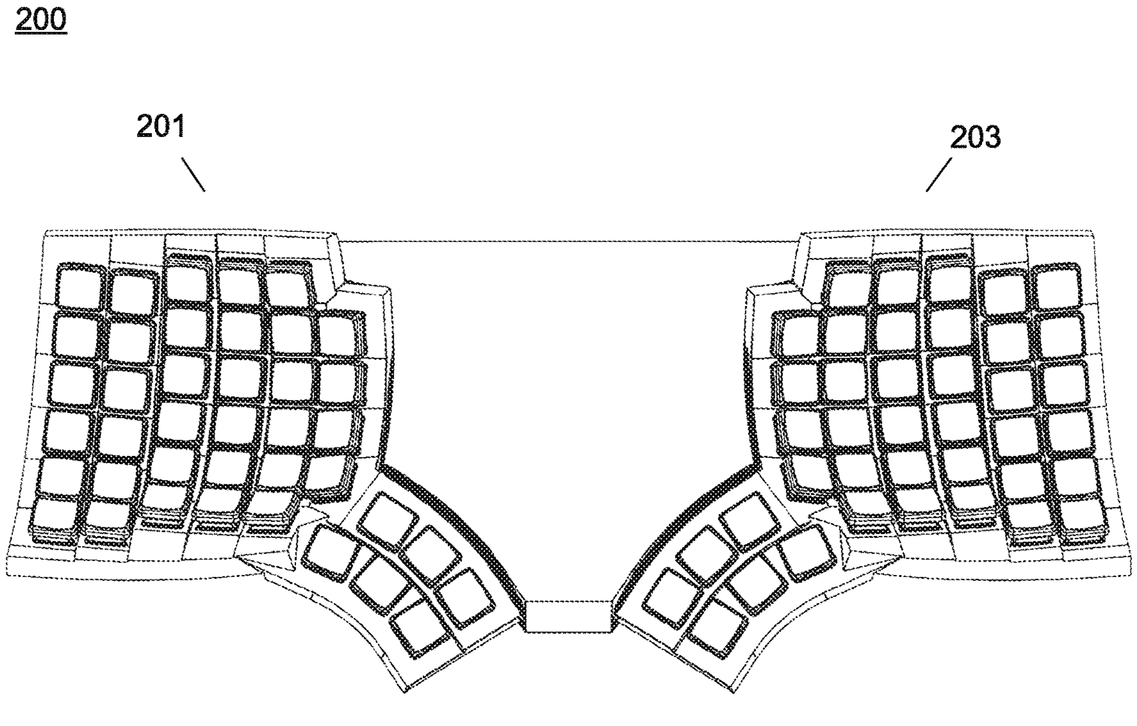
FIG. 13: is a plan view of a second variant of the keyboard which has both portions joined together to form the keyboard.

Referring to FIG. 13 a second variant of the keyboard 200 is shown in this variant the portions 201,203 are joined together. This join may be configured to allow the portions 201,203 to be separated if required.

Further, in any variant, the plurality of finger keys 206*a*-206*n*, intended to be actuated by fingers, are dimensioned and configured in a manner such that substantial movement of palm or hand is not required to actuate any of the finger keys 206*a*-206*n* during a typical typing session. The plurality of keys 206*a*-206*n* intended to be actuated by the fingers have a layout selected from a group comprising, an ortholinear, a columnar stagger, a uniform stagger, a symmetric stagger, and/or any combination foregoing.

Further, when the hand is in a natural typing position, a movement of the thumb from one key to another key (e.g. key 210*a* to 210*b* or 210*c*) is substantially and primarily through a flexion or extension motion of the thumb carpometacarpal joint 102. Moreover, movement of the thumb from one of keys 216*a*-216*c* of the outer thumb row 204 to another key 216*a*-216*c* of the outer thumb row 204 is substantially and primarily through a flexion or extension motion of the thumb carpometacarpal joint. The inner thumb row 202 and the outer thumb row 206 are be arranged such that actuating a key in the outer thumb row 206 would not cause the thumb to touch or interfere with a key in the inner thumb row 202.

In one variant of the present invention, the key cap for each of the thumb keys of the inner thumb row 202 and the outer thumb 204 are of cylindrical profile, with the axis of the key caps substantially at right angles to the tangent of the respective inner arc 208 and the outer arc 214.

Even though the numbering refers to thumb key 210*a*-210*c*, 216*a*-216*c* this is not intended to limit the number of thumb keys to a to c, it merely refers to the first, preferred variant and the number of thumb keys 210*a*-210*c*, 216*a*-216*c* in a specific thumb row 202,204 may be any whole number from 2 to 10. Likewise, referring to finger keys 206*a*-206*n* does not require there to be 14 keys, it could be any number from 2 to 50, though normally 10 to 40, depending on the specific requirements of the user. The number of thumb keys 210, 216 in the inner thumb row 202 may be different to the number of thumb keys 210, 216 in the outer thumb row 204. In some configurations the number of thumb keys 210, 216 in the inner thumb row 202 is less than the number of thumb keys 210,216 in the outer thumb row 204.

In the first and second variants shown in FIGS. 3 and 7 the finger keys 206*a*-206*n* are located in a concave section of the associated portion 201,203. This is the preferred configuration however they can be on a planar or convex section of that portion 201,203, or a combination of these.

The foregoing descriptions of specific variants of the present disclosure have been presented for purposes of illustration and description. They are not intended to be exhaustive or to limit the present disclosure to the precise forms disclosed, and obviously many modifications and variations are possible in light of the above teaching. The variants were chosen and described in order to best explain the principles of the present disclosure and its practical application, and to thereby enable others skilled in the art to best utilize the present disclosure and various variants with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A keyboard including:

an inner thumb row including a plurality of inner thumb keys configured to be actuated by a thumb which includes a thumb carpometacarpal (CMC) joint, such that a critical contact point of each of the plurality of inner thumb keys is arranged along an inner thumb arc on an inner thumb key plane; and an outer thumb row including a plurality of outer thumb keys configured to be actuated by the thumb, a critical contact point of each of the plurality of outer thumb keys is arranged along an outer thumb arc on an outer thumb key plane, wherein the inner and outer thumb key planes are non-coplanar, such that, when the keyboard is in use, said inner and outer thumb key planes intersect with each other and a palm plane, where the palm plane is the plane upon which a user's palm lies when the keyboard is in use;

wherein, where the inner thumb arc lies on the inner thumb key plane, said inner thumb arc follows a circular path from an inner thumb arc center at an inner arc radius, where the inner thumb arc center also lies on the inner thumb key plane;

wherein, where the outer thumb arc lies on the outer thumb key plane, said outer thumb arc follows a circular path from an outer thumb arc center at an outer arc radius, where the outer thumb arc center also lies on the outer thumb key plane;

wherein, the inner arc center and outer arc center have an arc center spacing of up to 15 mm, where the arc center spacing is a distance between the arc centers; and wherein, in use the keyboard is below a user's palm with the critical contact points for the thumb keys lying below the palm plane.

2. The keyboard as claimed in claim 1, wherein the inner and outer thumb key planes and palm plane, when the keyboard is in use, are configured to intersect at a CMC plane passing through the user's thumb CMC joint, such that said CMC plane is perpendicular to a line parallel a user's forearm.

3. The keyboard as claimed in claim 2, wherein, when the keyboard is in use, the angle between the palm plane and at least one of the inner and outer thumb key planes, as those planes intersect the CMC plane, is a primary palm thumb key plane angle θ, and said primary palm thumb key plane angle θ is from 160 to 180 degrees.

4. The keyboard as claimed in claim 3 wherein, the primary palm thumb key plane angle θ for each of the thumb key planes is independently selected from a range of 160 to 180 degrees.

5. The keyboard of claim 4 wherein, the thumb key planes are coincident at the CMC plane.

6. The keyboard as claimed in claim 5 wherein, each thumb key has a key cap with a cylindrical profile, with the axis of each key cap substantially aligned with a radius of the respective thumb arc.

7. The keyboard as claimed in claim 2, wherein, when the keyboard is in use, an angle between the palm plane and at least one of the inner and outer thumb key planes, as those planes intersect the CMC plane, is a primary palm thumb key plane angle θ, and said primary palm thumb key plane angle θ is from 160 to 180 degrees.

8. The keyboard as claimed in claim 2, wherein, when the keyboard is in use, an angle between the palm plane and at least one of the thumb key planes, as those planes intersect the CMC plane, is a primary palm thumb key plane angle θ, and said primary palm thumb key plane angle θ is from 160 to 180 degrees.

9. The keyboard as claimed in claim 1, wherein, when the keyboard is in use, at least one arc center is coincident with the user's thumb CMC joint.

10. The keyboard as claimed in claim 9, wherein both arc centers are coincident with the user's thumb CMC joint.

11. The keyboard as claimed in claim 10, wherein the keyboard further includes a plurality of keys, finger keys, configured to be actuated by a user's fingers, said finger keys are arranged such that when the keyboard is in use the user's palm does not require substantial movement to actuate them.

12. The keyboard as claimed in claim 11 wherein, the finger keys have a layout selected from a group consisting of, an ortho-linear layout, a columnar stagger layout, a uniform stagger layout, a symmetric stagger layout and any combination thereof.

13. The keyboard as claimed in claim 12, wherein, the keyboard includes two portions, a first portion and a second portion, such that each portion includes a plurality of finger keys and a thumb cluster, where the thumb cluster is the combination of the inner thumb keys and outer thumb keys of that portion.

14. The keyboard as claimed in claim 13 wherein, the first portion and second portion are separate parts of the keyboard.

15. The keyboard as claimed in claim 13 wherein, the first portion and second portion are releasably joined.

16. The keyboard of claim 15, wherein when the keyboard is in use the movement of the thumb from any one of the thumb keys to any other thumb key in the same thumb row is substantially and primarily through flexion or extension.

17. The keyboard as claimed in claim 1 wherein, each thumb key has a key cap with a cylindrical profile, with an axis of each key cap substantially aligned with a radius of the respective thumb arc.

18. The keyboard as claimed in claim 17 wherein there are at least three thumb keys in each thumb row.

19. The keyboard as claimed in claim 18 wherein, a number of thumb keys in the inner thumb row is greater than the number of thumb keys in the outer thumb row.

20. The keyboard as claimed in claim 18 wherein, the number of thumb keys in the outer thumb row is greater than the number of thumb keys in the inner thumb row.

21. The keyboard as claimed in claim 1 wherein, where the inner thumb arc lies on the inner thumb key plane, said inner thumb arc follows a circular path from an inner thumb arc center at an inner arc radius, where the inner thumb arc center also lies on the inner thumb key plane and/or the outer thumb arc lies on the outer thumb key plane, said outer thumb arc follows a circular path from an outer thumb arc center at an outer arc radius, where the outer thumb arc center also lies on the outer thumb key plane.

22. The keyboard as claimed in claim 1, wherein the keyboard further includes a plurality of keys, finger keys, configured to be actuated by a user's fingers, said finger keys are arranged such that when the keyboard is in use the user's palm does not require substantial movement to actuate them.

23. The keyboard of claim 1, wherein when the keyboard is in use a movement of the thumb from any one of the thumb keys to any other thumb key in the same thumb row is substantially and primarily through flexion or extension.

* * * * *